US012765731B2

(12) United States Patent
Xu et al.

(10) Patent No.: US 12,765,731 B2
(45) Date of Patent: Oct. 20, 2026

(54) DUST BOX, AUTOMATIC CLEANING APPARATUS AND DUST COLLECTION PILE

(71) Applicant: BEIJING ROBOROCK TECHNOLOGY CO., LTD., Beijing (CN)

(72) Inventors: Hongliang Xu, Beijing (CN); Guang Yu, Beijing (CN); Chuanlin Duan, Beijing (CN); Dahong Gong, Beijing (CN); Yongfei Zhou, Beijing (CN)

(73) Assignee: BEIJING ROBOROCK TECHNOLOGY CO., LTD., Beijing (CN)

( * ) Notice: Subject to any disclaimer, the term of this patent is extended or adjusted under 35 U.S.C. 154(b) by 335 days.

(21) Appl. No.: 18/574,711

(22) PCT Filed: Jun. 24, 2022

(86) PCT No.: PCT/CN2022/101265
§ 371 (c)(1),
(2) Date: Dec. 27, 2023

(87) PCT Pub. No.: WO2023/274086
PCT Pub. Date: Jan. 5, 2023

(65) Prior Publication Data

US 2024/0292986 A1 Sep. 5, 2024

(30) Foreign Application Priority Data

Jun. 28, 2021 (CN) ........................ 202110719171.X

(51) Int. Cl.
*A47L 9/14* (2006.01)
*A47L 9/00* (2006.01)
(Continued)

(52) U.S. Cl.
CPC ........... *A47L 9/1409* (2013.01); *A47L 9/0063* (2013.01); *A47L 9/122* (2013.01); *A47L 9/149* (2013.01);
(Continued)

(58) Field of Classification Search
CPC ...... A47L 9/1409; A47L 9/0063; A47L 9/122; A47L 9/149; A47L 2201/024; A47L 2201/04; F16K 15/063
See application file for complete search history.

(56) References Cited

U.S. PATENT DOCUMENTS

2012/0102670 A1* 5/2012 Jang ...................... A47L 9/1463 15/49.1
2016/0278596 A1* 9/2016 Janzen ................ A47L 11/4066
(Continued)

FOREIGN PATENT DOCUMENTS

CN 101254080 A * 9/2008 ............. A47L 9/106
CN 106264335 A * 1/2017 ................ B25J 9/16
(Continued)

OTHER PUBLICATIONS

CN 209564073 U—English Machine Translation—2019 (Year: 2019).*
(Continued)

*Primary Examiner* — Marc Carlson
(74) *Attorney, Agent, or Firm* — Calfee, Halter & Griswold LLP

(57) ABSTRACT

Disclosed are a dust box, an automatic cleaning apparatus and a dust collection pile. The dust box includes: a dust box body including a bottom wall and sidewalls disposed around edges of the bottom wall, the sidewalls extend from the bottom wall away from the bottom wall, the bottom wall and the sidewalls define an accommodation space, the sidewall is defined with a first through hole, and the first through hole
(Continued)

is a pathway for garbage to enter or move out of the accommodation space, a check valve assembly is disposed on the sidewall of the dust box, and the check valve assembly is biased in a closed state, and in response to an external acting force applied to the check valve assembly being greater than a threshold, the check valve assembly is switched from the closed state to an open state.

20 Claims, 6 Drawing Sheets

(51) Int. Cl.
*A47L 9/12* (2006.01)
*F16K 15/06* (2006.01)

(52) U.S. Cl.
CPC ....... *F16K 15/063* (2013.01); *A47L 2201/024* (2013.01); *A47L 2201/04* (2013.01)

(56) References Cited

U.S. PATENT DOCUMENTS

| | | | |
|---|---|---|---|
| 2018/0078107 A1 | 3/2018 | Gagnon et al. | |
| 2019/0223669 A1* | 7/2019 | Lauer | B01D 46/0005 |

FOREIGN PATENT DOCUMENTS

| | | | | | |
|---|---|---|---|---|---|
| CN | 107205602 A | * | 9/2017 | A47L 9/106 |
| CN | 108403016 A | | 8/2018 | |
| CN | 108497995 A | | 9/2018 | |
| CN | 110338716 A | | 10/2019 | |
| CN | 209564073 U | * | 11/2019 | |
| CN | 111973065 A | | 11/2020 | |
| CN | 211883655 U | * | 11/2020 | |
| CN | 211911518 U | | 11/2020 | |
| CN | 112369971 A | | 2/2021 | |
| CN | 112401765 A | * | 2/2021 | A47L 11/4041 |
| CN | 212465864 U | * | 2/2021 | A47L 9/02 |
| CN | 212521676 U | | 2/2021 | |
| CN | 114587186 A | | 6/2022 | |
| CN | 216854569 U | | 7/2022 | |
| DE | 102010017213 A1 | | 12/2011 | |
| DE | 102019125002 A1 | | 3/2021 | |
| EP | 3313255 B1 | * | 6/2020 | A47L 9/149 |
| JP | 2017536938 A | * | 12/2017 | A47L 9/106 |

OTHER PUBLICATIONS

CN 112401765 A—English Machine Translation—2021 (Year: 2021).*
Extended European Search Report of application No. 22831900.0 dated Jun. 2, 2025.
Second Office Action of application No. 202110719171.X dated Jun. 24, 2025.
First Office Action of Japanese application No. 2023-580863 dated Oct. 22, 2024.
First Office Action of Chinese application No. 202110719171.X dated Dec. 16, 2024.
Office action from Taiwanese Application No. 111124117 dated Nov. 30, 2023.
International Search Report from PCT/CN2022/101265 dated Aug. 17, 2022.

* cited by examiner

DUST BOX, AUTOMATIC CLEANING APPARATUS AND DUST COLLECTION PILE

CROSS-REFERENCE TO RELATED APPLICATION

The present disclosure is the U.S. National Phase Application of PCT Application No. PCT/CN2022/101265, filed on Jun. 24, 2022, which is based on and claims priority to Chinese Patent Application No. 202110719171.X filed on Jun. 28, 2021, both of which are herein incorporated by reference in its entirety as a portion of the present application.

TECHNICAL FIELD

The present disclosure relates to the field of automatic cleaning apparatus technologies, and in particular, to a dust box, an automatic cleaning apparatus and a dust collection pile.

BACKGROUND

With the continuous development of science and technology, automatic cleaning apparatuses, for example robot vacuum cleaners, have been widely used in families. Compared with traditional manual cleaning, the robot vacuum cleaners are more time-saving and labor-saving, and it is only necessary to clear dust boxes in the robot vacuum cleaners after the cleaning is completed. However, a user needs to bend down to clear the dust boxes frequently due to the limited capacity and low position of the dust boxes of the robot vacuum cleaners, which is not good for the health of the user.

SUMMARY

Some embodiments of the present disclosure provide a dust box. The dust box includes a dust box body, including a bottom wall and sidewalls disposed around edges of the bottom wall, wherein the sidewalls extend from the bottom wall away from the bottom wall, and the bottom wall and the sidewalls define an accommodation space; and wherein the sidewall is provided with a first through hole, which is a pathway for garbage to enter or move out of the accommodation space, a check valve assembly is disposed on the sidewall of the dust box, and the check valve assembly is biased in a closed state, and is switched from the closed state to an open state in response to an external acting force applied to the check valve assembly being greater than a threshold.

In some embodiments, the check valve assembly includes: a second through hole disposed in the sidewall; a valve component, which is configured to abut against an edge of the second through hole to close the second through hole in response to the check valve assembly being in the closed state; and configured to be separated from at least a portion of the edge of the second through hole in response to the check valve assembly being in the open state, such that an airflow enters the accommodation space via the second through hole; and an elastic component connected to the valve component, the elastic component being configured to bias the valve component to a position where the second through hole is closed.

In some embodiments, the sidewalls include a first sidewall and a second sidewall adjacent to the first sidewall, wherein the first through hole is defined in the first sidewall, and is configured as the pathway for the garbage to enter or move out of the accommodation space, and the check valve assembly is disposed on the second sidewall.

In some embodiments, the dust box further includes: a filter screen assembly detachably accommodated in the accommodation space, wherein the filter screen assembly divides the accommodation space into a first accommodation space and a second accommodation space, which are disposed sequentially away from the bottom wall; and the first through hole and the second through hole are both located between the filter screen assembly and the bottom wall.

In some embodiments, the sidewalls further include a third sidewall, which is provided with an air outlet; the air outlet is disposed on a side of the filter screen assembly away from the bottom wall; and the second sidewall is disposed opposite to the third sidewall.

In some embodiments, the dust box further includes: a dust box cover, which is matched with the dust box body and configured to cover a top of the accommodation space.

Some embodiments of the present disclosure provide an automatic cleaning apparatus. The automatic cleaning apparatus includes:

the dust box according to the foregoing embodiment; a first fan connected to the air outlet, the first fan being configured to extract an airflow from the accommodation space via the air outlet; and a ventilation port communicated with the first through hole to provide a pathway for garbage to enter or move out of the automatic cleaning apparatus.

In some embodiments, in response to the automatic cleaning apparatus being in a cleaning work mode, the first fan works to generate the external acting force applied to the check valve assembly, and the external acting force is less than the threshold.

Some embodiments of the present disclosure provide a dust collection pile, wherein the dust collection pile is configured to collect the garbage in the dust box in the automatic cleaning apparatus according to the foregoing embodiments, and includes: a dust-collection air path, wherein an inlet of the dust-collection air path is configured to be communicated with the ventilation port when the automatic cleaning apparatus is connected to the dust collection pile to carry out a dust collection operation; a dust-collection container, wherein an air inlet of the dust-collection container is communicated with an outlet of the dust-collection air path, and the dust-collection container is configured to accommodate the garbage from the dust box of the automatic cleaning apparatus; and a second fan connected to an air outlet of the dust-collection container to extract the airflow from the accommodation space via the first through hole.

In some embodiments, in response to the automatic cleaning apparatus being in a dust exhaust mode, the first fan and the second fan work simultaneously to generate the external acting force applied to the check valve assembly, and the external acting force is greater than the threshold.

In some embodiments, working power of the first fan when the automatic cleaning apparatus is in the dust exhaust mode is less than or equal to the working power of the first fan when the automatic cleaning apparatus is in a cleaning work mode.

Compared with the related art, the above solutions in the embodiments of the present disclosure at least have the following beneficial effects.

The dust box having the sidewall provided with the check valve assembly can be suitable for collecting the garbage in the dust box to the automatic cleaning apparatus in the dust collection pile; when the automatic cleaning apparatus performs cleaning work, the check valve assembly of the dust box is in the closed state, the fan in the automatic cleaning apparatus per se sucks garbage such as dust into the dust box from a garbage access of the dust box, such that the automatic cleaning apparatus collects the garbage into the dust box when performing the cleaning work. When the automatic cleaning apparatus returns to the dust collection pile to dock with the dust collection pile and collects the garbage in the dust box into the dust collection pile, the fan in the dust collection piles works, and the check valve assembly is switched from the closed state to the open state under the action of the suction force generated by the fan. At this point, the check valve assembly forms an air inlet in the dust box, i.e., an air intake for the whole airflow channel, such that the airflow transfers dust and other garbage in the dust box into the dust collection pile.

BRIEF DESCRIPTION OF THE DRAWINGS

The accompanying drawings here, incorporated in and constituting a portion of the Description, show embodiments conforming to the present disclosure, and are used together with the Description to explain the principles of the present disclosure. Obviously, the accompanying drawings in the following description only show some embodiments of the present disclosure, and those of ordinary skills in the art can still derive other drawings from these accompanying drawings without creative efforts. In the accompanying drawings.

DETAILED DESCRIPTION

Figure 1:
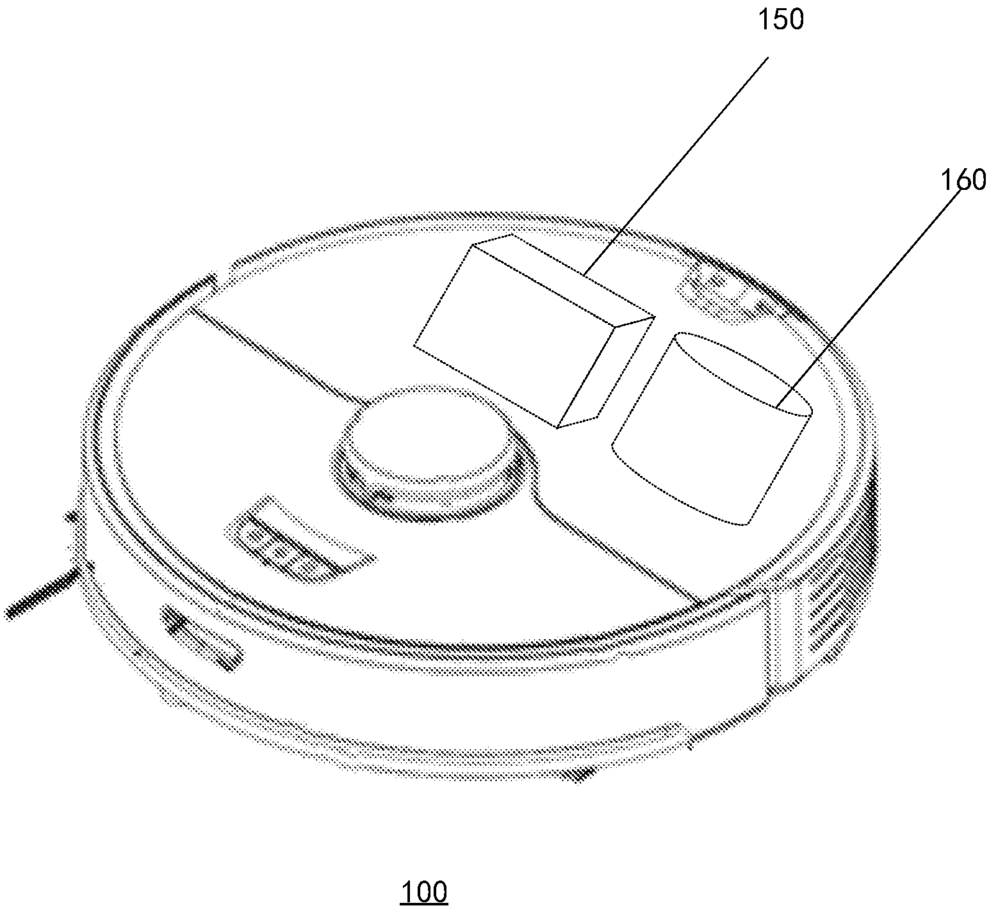
FIG. 1 is a schematic structural diagram of an automatic cleaning apparatus according to some embodiments of the present disclosure.

To make the objects, technical solutions and advantages of the present disclosure clearer, the present disclosure will be further described in detail below in combination with the accompanying drawings. Obviously, the described embodiments are only part but not all of the embodiments of the present disclosure. All other embodiments obtained by those of ordinary skills in the art without creative efforts based on the embodiments in the present disclosure shall fall within the protection scope of the present disclosure.

It should also be noted that the terms "comprise", "include" or any other variants are intended to cover the nonexclusive inclusion, such that a commodity or device including a series of elements not only includes those elements, but also includes other elements that are not explicitly listed, or also includes the inherent elements of such a commodity or device. Without more restrictions, an element defined by the phrase "comprising a . . . " does not exclude the existence of an additional identical element in the commodity or device including such an element.

An automatic cleaning apparatus generally includes a dust box for collecting garbage. When the automatic cleaning apparatus performs a cleaning operation, the garbage (for example, dust, paper scraps or the like) is collected into the dust box. When a larger amount of garbage is collected in the dust box, a user may take out the dust box from the automatic cleaning apparatus and open the dust box to clear the garbage therein. When the garbage in the dust box is cleared, it is generally necessary to take out a filter screen assembly from the dust box so as to clear the garbage.

The present disclosure provides a dust box, for example, a dust box for an automatic cleaning apparatus, for example, a robot vacuum cleaner. The dust box includes: a dust box body and a dust box cover. The dust box body includes a bottom wall and sidewalls disposed around edges of the bottom wall; the sidewalls extend from the bottom wall away from the bottom wall; and the bottom wall and the sidewalls define an accommodation space. The dust box cover matches the dust box body, and is configured to cover the top of the accommodation space. The sidewall is provided with a first through hole, which is a pathway for garbage to enter or move out of the accommodation space; a check valve assembly is disposed on the sidewall of the dust box; and the check valve assembly is biased in a closed state, and is switched from the closed state to an open state in response to an external acting force applied to the check valve assembly being greater than a threshold.

The automatic cleaning apparatus with this dust box may be used in combination with a dust collection pile. When the automatic cleaning apparatus performs cleaning work, the check valve assembly of the dust box is in the closed state, a fan (for example, a first fan) in the automatic cleaning apparatus per se sucks the garbage such as dust into the dust box from a garbage access (for example, the first through hole) of the dust box, such that the automatic cleaning apparatus collects the garbage into the dust box when performing the cleaning work. When the automatic cleaning apparatus returns to the dust collection pile and docks with the dust collection pile to collect the garbage in the dust box into the dust collection pile, a fan (for example, a second fan) in the dust collection piles works, and the check valve assembly is switched from the closed state to the open state under the action of a suction force generated by the second fan. At this point, the check valve assembly forms an air inlet in the dust box, i.e., an air intake for the whole airflow channel, such that the airflow transfers dust and other garbage in the dust box into the dust collection pile.

The embodiments of the present disclosure will be explained in detail below in combination with the accompanying drawings. In the embodiments below, a dust-collection charging pile is taken as an example to explain the dust collection pile. In the dust-collection charging pile, a dust-collection container with a larger volume is integrated on a charging pile of a robot vacuum cleaner. After the robot vacuum cleaner returns to the dust-collection charging pile after cleaning, the dust-collection container disposed in the dust-collection charging pile may collect the garbage in the dust box of the robot vacuum cleaner. When dust is collected in the dust-collection container, it is necessary to dock a dust inlet-outlet port of the robot vacuum cleaner with a dust suction port of the dust-collection charging pile, so as to avoid dust leakage to the outside to cause secondary pollution. Those skilled in the art can understand that the solutions of the present disclosure are equally applicable to the dust collection pile that does not include a charging function.

Figure 2:
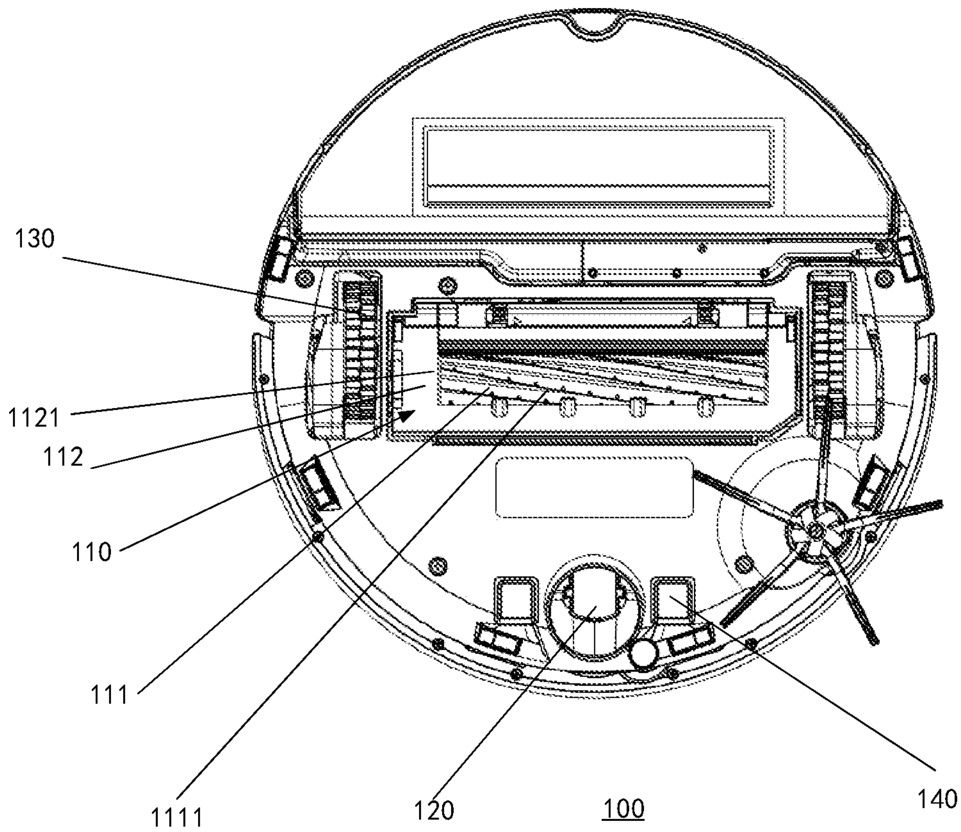
FIG. 2 is a schematic structural diagram of the bottom of the automatic cleaning apparatus shown in FIG. 1.

FIG. 1 is a schematic structural diagram of an automatic cleaning apparatus according to some embodiments of the present disclosure; and FIG. 2 is a schematic structural diagram of the bottom of the automatic cleaning apparatus shown in FIG. 1.

As shown in FIG. 1 and FIG. 2, an automatic cleaning apparatus 100 (for example, a robot vacuum cleaner) includes a steering wheel 120 and drive wheels 130, and under the action of the steering wheel 120 and the drive wheels 130, the automatic cleaning apparatus 100 is movable on a support surface, for example, the ground. In an embodiment, the automatic cleaning apparatus 100 may move according to a pre-set route, and under specific circumstances, for example, when the automatic cleaning apparatus 100 itself has a low battery, when the dust box of the automatic cleaning apparatus 100 itself is full of garbage, when the automatic cleaning apparatus 100 completes cleaning work or the like, the automatic cleaning apparatus 100 may move back to the dust-collection charging pile to complete charging or to unload the garbage into the dust-collection container.

The automatic cleaning apparatus 100 further includes charging electrodes 140, which are configured to be electrically connected to the dust-collection charging pile to charge the automatic cleaning apparatus 100, after the automatic cleaning apparatus 100 returns to the dust-collection charging pile. As shown in FIG. 2, in some embodiments, the charging electrodes 140 are disposed on the bottom surface of the automatic cleaning apparatus 100, the number of the charging electrodes 140 is for example two, and the two charging electrodes are arranged at the two sides of the steering wheel 120, respectively. Those skilled in the art may understand that the above provides only an example of the number and arrangement positions of the charging electrodes, and the present disclosure does not specifically define the number and arrangement positions of the charging electrodes.

The automatic cleaning apparatus 100 further includes a cleaning module 110, for example, a dry cleaning module. The cleaning module 110 is configured to clean at least a portion of the support surface (for example, the ground) when the automatic cleaning apparatus 100 moves on the support surface (for example, the ground). In some embodiments, as shown in FIG. 2, the cleaning module 110 is for example arranged between the two drive wheels 130. The cleaning module 110 specifically includes a framework 112 and a roller brush 111 arranged in the framework 112, and a plurality of scraping strips 1111 are arranged on the periphery of the roller brush 111. The framework 112 has a ventilation port 1121, which exposes at least a portion of the roller brush 111.

When the automatic cleaning apparatus 100 performs a cleaning operation, the roller brush 111 rotates, the scraping strips 1111 on the roller brush 111 which are exposed by the framework 112 may contact with the ground, and meanwhile, a fan (for example, a first fan 160) in the automatic cleaning apparatus 100 produces airflow that enters the framework 112 via the ventilation port 1121. Under the action of the scraping strips 1111 and the airflow, the garbage enters the framework 112 via the ventilation port 1121, and then is collected into the dust box of the automatic cleaning apparatus 100. The ventilation port 1121 also serves as a circulation port for the garbage. That is, when the automatic cleaning apparatus 100 performs the cleaning operation, the ventilation port 1121 serves as a dust suction port for the automatic cleaning apparatus 100.

The automatic cleaning apparatus 100 further includes a dust box 150 and a first fan 160, which are arranged therein. The dust box 150 is configured to collect garbage such as dust when the automatic cleaning apparatus 100 performs the cleaning work. The dust box 150 is communicated with the cleaning module 110. The first fan 160 is configured to provide a suction power source when the automatic cleaning apparatus 100 performs the cleaning operation, to produce an airflow. When the automatic cleaning apparatus 100 performs the cleaning operation, the garbage enters the framework 112 via the ventilation port 1121 under the action of the airflow produced by the first fan 160, and then is collected into the dust box 150 of the automatic cleaning apparatus 100.

Figure 3:
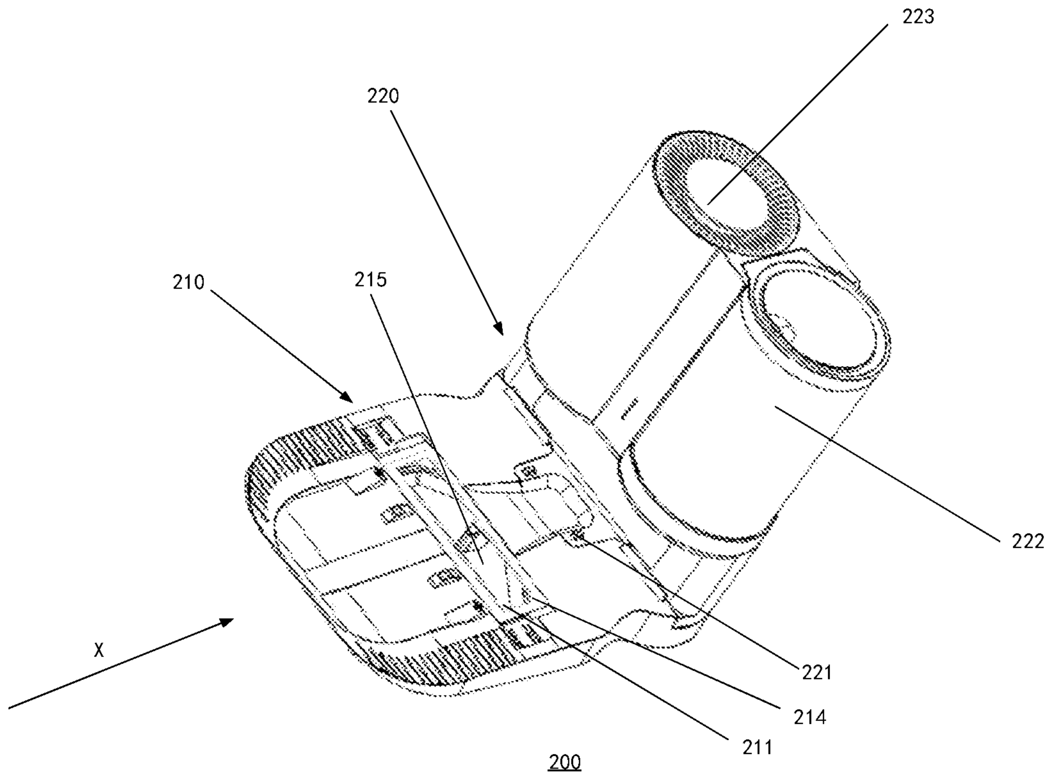
FIG. 3 is a schematic structural diagram of a dust-collection charging pile according to some embodiments of the present disclosure.

FIG. 3 is a schematic structural diagram of the dust-collection charging pile according to some embodiments of the present disclosure. The dust-collection charging pile 200 has the functions of both a charging pile and a dust collection pile, and is configured to provide energy supply and garbage collection for the automatic cleaning apparatus 100.

As shown in FIG. 3, the dust-collection charging pile 200 includes a dust-collection charging pile base 210 and a dust-collection charging body 220. The dust-collection charging body 220 is configured to charge the automatic cleaning apparatus 100 and collect the garbage in the dust box 150 of the automatic cleaning apparatus 100, and is arranged on the dust-collection charging pile base 210. The dust-collection charging body 220 includes a dust-collection container 222 and a dust collection fan 223, also known as a second fan 223. The dust-collection container 222 has, for example, the shape of a barrel, and is configured to collect the garbage in the dust box 150 of the automatic cleaning apparatus 100. The second fan 223 is configured to be connected to an air outlet of the dust-collection container 222 so as to provide power for collecting the garbage in the dust box 150 of the automatic cleaning apparatus 100 into the dust-collection container 222.

The dust-collection charging pile 200 includes a charging connector 221 and a dust suction port 211. The charging connector 221 is configured to supply energy to the automatic cleaning apparatus 100; and the dust suction port 211 is configured to dock with a dust outlet of the automatic cleaning apparatus 100 (when the automatic cleaning apparatus 100 exhausts the dust into the dust-collection charging pile 200, the ventilation port 1121 in the automatic cleaning apparatus 100 serves as a dust outlet), such that the garbage in the dust box of the automatic cleaning apparatus 100 enters the dust-collection container 222 of the dust-collection charging body 220 via the dust suction port 211. For example, as shown in FIG. 3, the charging connector 221 is disposed on the dust-collection charging body 220, and the dust suction port 211 is disposed on the dust-collection charging pile base 210. In some embodiments, as shown in FIG. 3, a sealing gasket 214 is further arranged around the dust suction port 211 for sealing after the dust suction port 211 docks with the dust outlet of the automatic cleaning apparatus 100, thereby preventing garbage leakage.

The air inlet of the dust-collection container 222 is communicated with the dust suction port 211 through a dust-collection air path 215, and under the action of the airflow produced by the second fan 223, the garbage in the dust box 150 in the automatic cleaning apparatus 100 may pass through the ventilation port 1121 in the automatic cleaning apparatus 100 and be collected into the dust-collection container 222 via the dust-collection air path 215.

Figure 4:
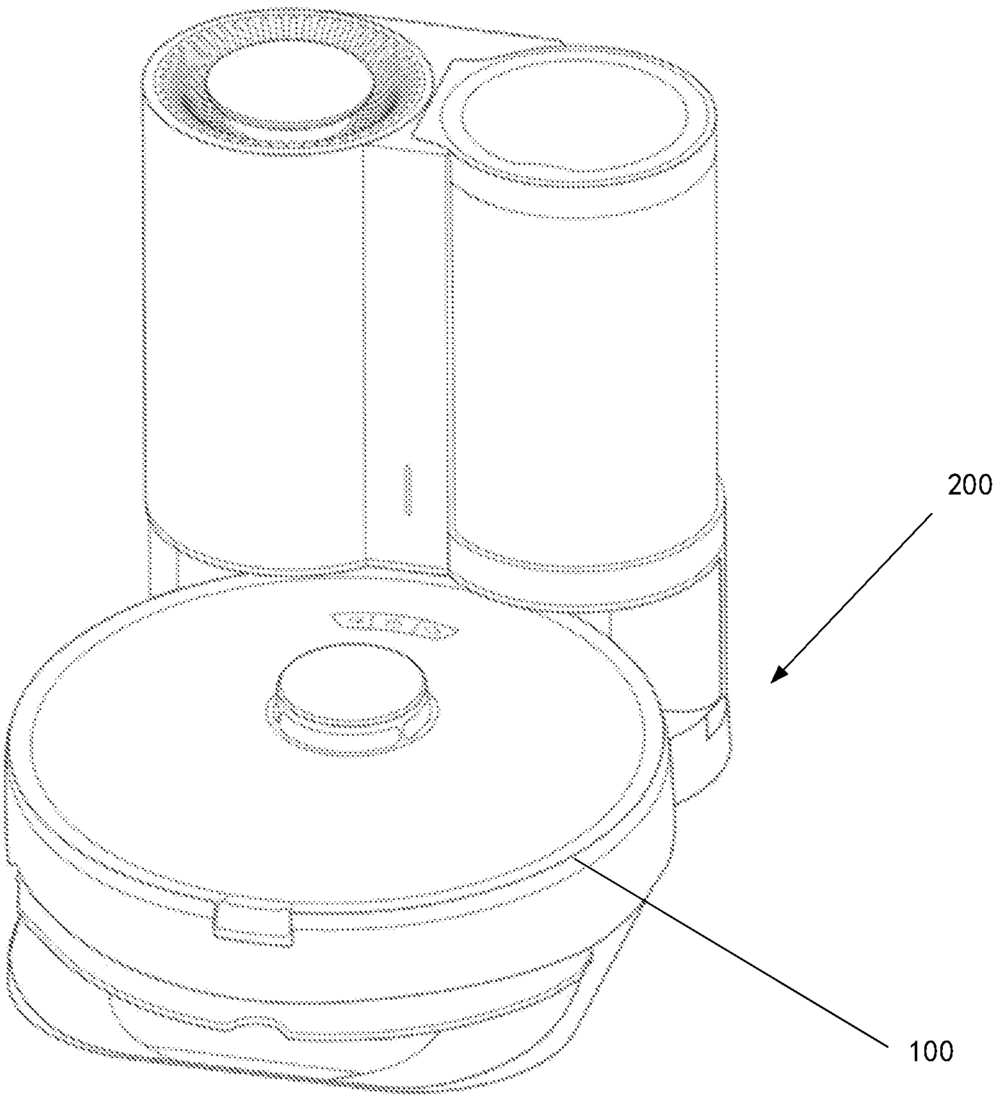
FIG. 4 is a schematic diagram of a scenario after an automatic cleaning apparatus returns to a dust-collection charging pile according to some embodiments of the present disclosure.

FIG. 4 is a schematic diagram of a scenario after the automatic cleaning apparatus returns to the dust-collection charging pile according to some embodiments of the present disclosure. As shown in FIG. 4, when the automatic cleaning apparatus 100 (for example, a robot vacuum cleaner) returns to the dust-collection charging pile 200 after completing cleaning, the automatic cleaning apparatus 100 moves onto the dust-collection charging pile base 210 in a first direction X, such that the charging electrode 140 on the automatic cleaning apparatus 100 is electrically connected to the charging connector 221 to charge the automatic cleaning apparatus 100, and the dust outlet (i.e., the ventilation port 1121) of the automatic cleaning apparatus 100 docks with the dust suction port 211 of the dust-collection charging pile 200 so as to transfer the garbage in the dust box of the automatic cleaning apparatus 100 to the dust-collection container 222 of the dust-collection charging pile 200.

Figure 5:
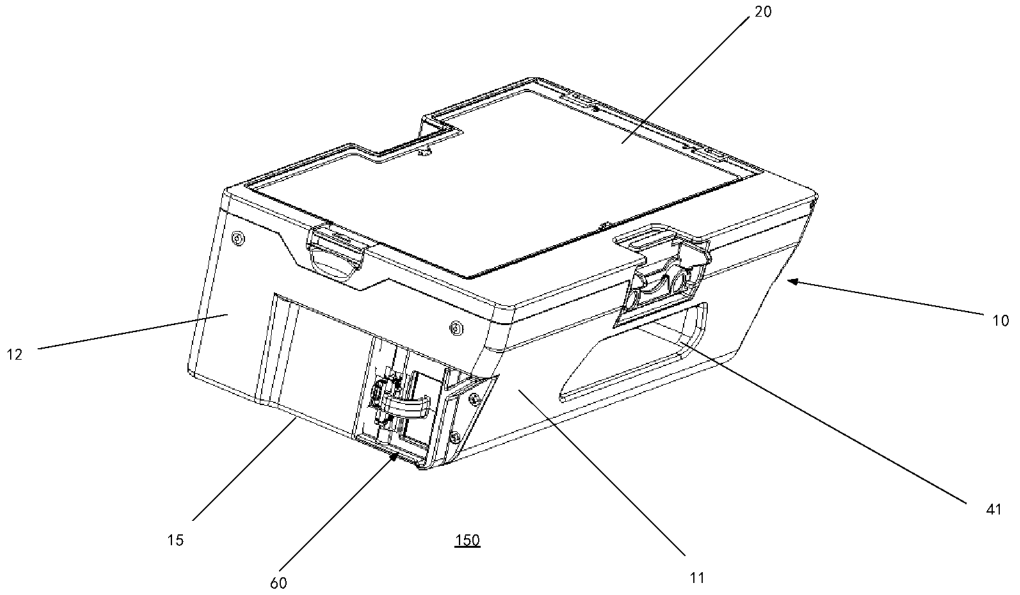
FIG. 5 is a schematic structural diagram of a dust box according to some embodiments of the present disclosure.
Figure 6:
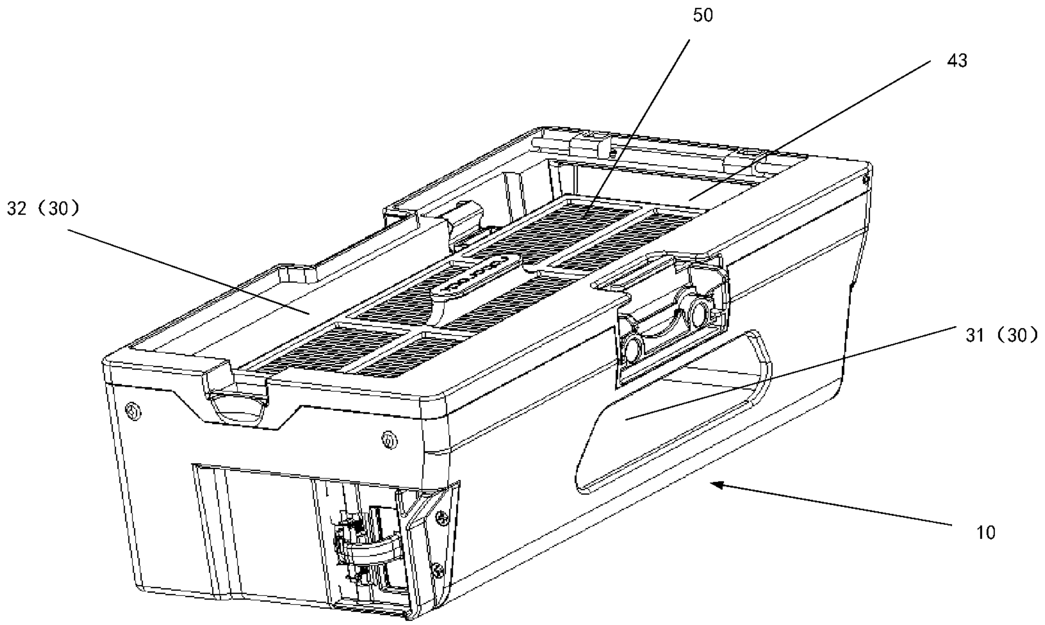
FIG. 6 is a schematic structural diagram of a dust box body of the dust box shown in FIG. 5.
Figure 7:
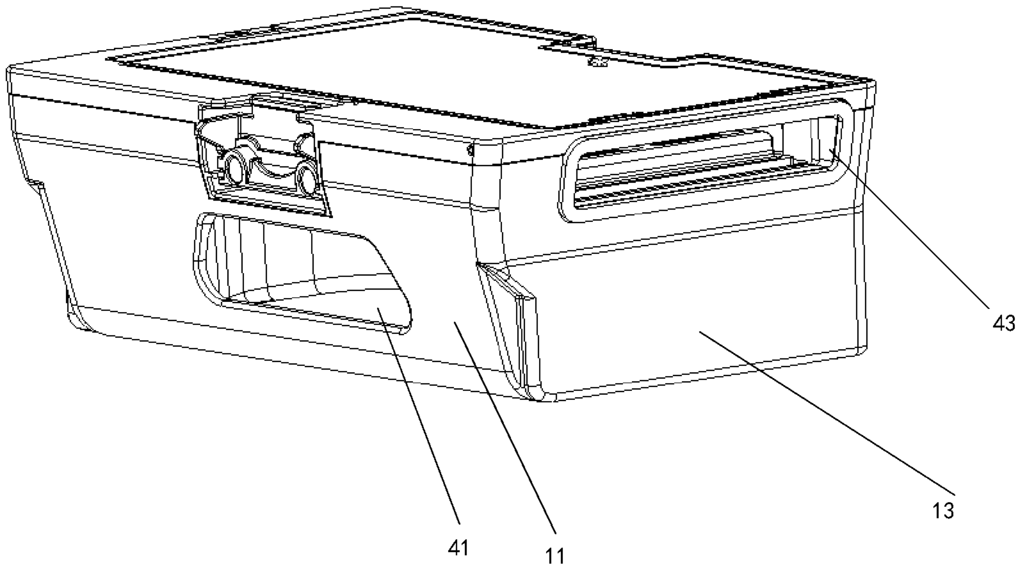
FIG. 7 is a schematic structural diagram of the dust box shown in FIG. 5 from another perspective.

FIG. 5 is a schematic structural diagram of the dust box according to some embodiments of the present disclosure; FIG. 6 is a schematic structural diagram of the dust box body of the dust box shown in FIG. 5; and FIG. 7 is a schematic structural diagram of the dust box shown in FIG. 5 from another perspective. As shown in FIGS. 5-7, the dust box 150 includes the dust box body 10. The dust box body 10 includes a bottom wall 15 and sidewalls disposed around edges of the bottom wall 15. The sidewalls extend away from the bottom wall 15 from the bottom wall 15, and the bottom wall 15 and the sidewalls define an accommodation space 30. As shown in FIGS. 5-7, the number of sidewalls is for example four, and the dust box 150 is substantially cuboidal as a whole.

In some embodiments, the dust box further includes a dust box cover 20, which matches the dust box body 10 and is configured to cover the top of the accommodation space 30. For example, the dust box cover 20 is pivotally connected to one of the sidewalls of the dust box body 10, such that the dust box 150 can be switched between an open state and a closed state.

The dust box body 10 is roughly cuboidal, and an orthographic projection of the dust box body 10 on a plane where the bottom wall 15 is located is roughly rectangular. The sidewalls of the dust box body 10 include two short-side sidewalls and two long-side sidewalls of the dust box body 10. The short-side sidewalls described herein represent the sidewalls of the cuboid corresponding to the short sides of the rectangular projection, and correspondingly, the long-side sidewalls described herein represent the sidewalls of the cuboid corresponding to the long sides of the rectangular projection. The dust box cover 20 is rotatable around a pivot axis with respect to one short-side sidewall of the dust box body 10, so that it is convenient for a user to carry out operations such as clearing the garbage in the dust box 150, and cleaning or replacing a filter screen structure.

In some embodiments, when the dust box cover 20 completely covers the top of the accommodation space 30 and is clamped with the dust box body 10 via a snap-fit structure, the dust box 150 is in the closed state. When the dust box cover 20 is rotated to expose at least a portion of the accommodation space 30, the dust box 150 is in the open state. The dust box 150 may be switched between the closed state and the open state, so that it is convenient for a user to carry out operations such as clearing the garbage in the dust box 150, and cleaning or replacing a filter screen structure.

A first sidewall 11 of the dust box body 10 is provided with a first through hole 41, which serves as a pathway for garbage to enter or move out of the accommodation space 30, and a second sidewall 12 of the dust box 150 is provided with a check valve assembly 60. The first sidewall 11 is for example a long-side sidewall of the dust box body 10, and the second sidewall 12 is for example a short-side sidewall of the dust box body 10. The check valve assembly 60 is biased in a closed state, and is switched from the closed state to an open state in response to an external acting force applied to the check valve assembly 60 greater than a threshold. The external acting force is, for example, a suction force generated when the first fan 160 of the automatic cleaning apparatus 100 or the second fan 223 in the dust-collection charging pile 200 is in a working state. The threshold is a critical value of the external acting force that needs to be provided when the check valve assembly 60 is switched from the closed state to the open state.

In some embodiments, the power of the first fan 160 of the automatic cleaning apparatus 100 is obviously less than the power of the second fan 223 in the suction dust-collection charging pile 200. That is, the suction force generated when the first fan 160 is working is obviously less than the suction force generated when the second fan 223 is working. Specifically, when the automatic cleaning apparatus 100 performs a cleaning operation, that is, when the automatic cleaning apparatus 100 is in a cleaning work mode, the suction force generated when the first fan 160 is working is less than the threshold, the check valve assembly 60 is in the closed state, and under the action of the airflow produced by the first fan 160, the garbage enters the framework 112 via the ventilation port 1121, and is then collected into the dust box 150 of the automatic cleaning apparatus 100. When the automatic cleaning apparatus 100 returns to the dust-collection charging pile 200 and docks with the dust-collection charging pile 200 to collect the garbage in the dust box 150 into the dust-collection container 222 in the dust-collection charging pile 200, specifically, the automatic cleaning apparatus 100 moves onto the dust-collection charging pile base 210 in a first direction X to allow the dust outlet of the automatic cleaning apparatus 100 (i.e., the ventilation port 1121) to be hermetically docked with the dust suction port 211 of the dust-collection charging pile 200, the second fan 223 in the dust collection pile is in the working state, and under the action of the suction force generated by the second fan 223, the check valve assembly 60 is switched from the closed state to the open state. At this point, the check valve assembly forms an air inlet in the dust box 150 (i.e., the air intake of the whole airflow channel), such that the airflow transfers the dust and other garbage in the dust box 150 into the dust-collection container 222 in the dust-collection charging pile 200.

In some embodiments, when the automatic cleaning apparatus 100 is located on the dust-collection charging pile base 210 of the dust-collection charging pile 200 to collect the garbage in the dust box 150 into the dust-collection container 222 in the dust-collection charging pile 200, that is, when the automatic cleaning apparatus 100 is in a dust exhaust mode, the second fan 223 generates a strong suction force during working, while the first fan 160 in the automatic cleaning apparatus 100 is also in the working state. Thus, the strong suction force generated by the second fan is prevented from causing the reversing of the first fan 160 in the automatic cleaning apparatus 100, thereby avoiding causing damage to the first fan 160. At this point, the first fan and the second fan work simultaneously to generate an external acting force, greater than the threshold, applied to the check valve assembly, the check valve assembly 60 is in the open state, and the strong airflow produced by the second fan 223 with large power carries and collects the garbage in the dust box 150 into the dust-collection container 222 in the dust-collection charging pile 200.

Figure 8:
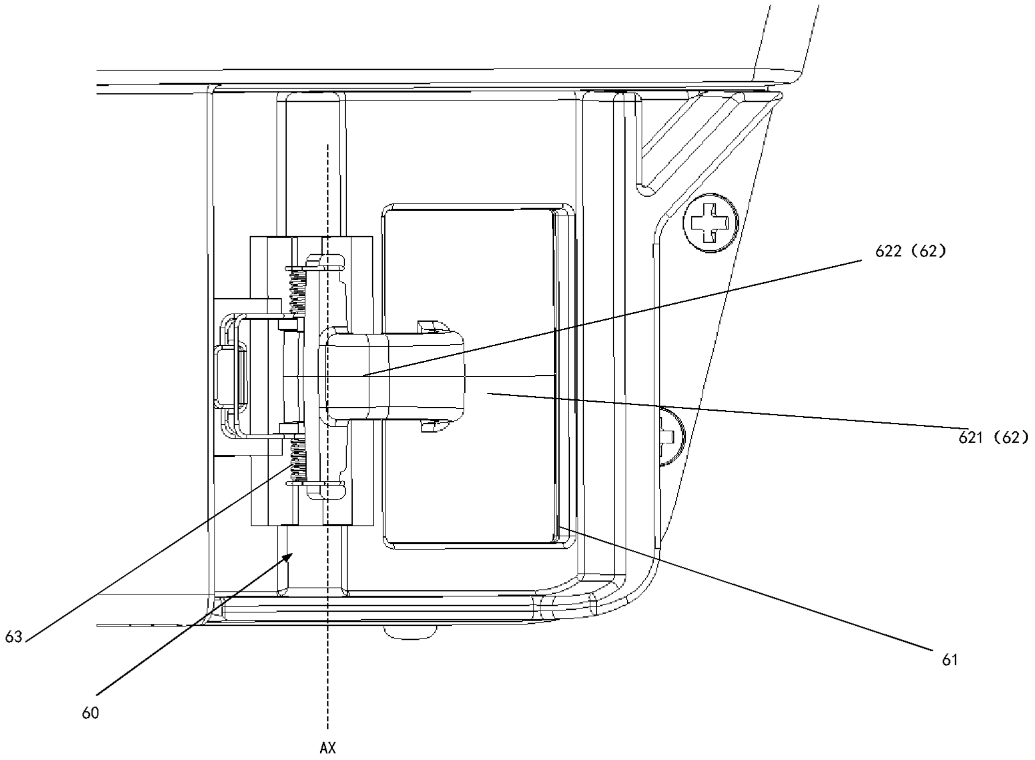
FIG. 8 is a schematic structural diagram of a check valve assembly shown in FIG. 5.

FIG. 8 shows a schematic structural diagram of the check valve assembly shown in FIG. 5. In some embodiments, as shown in FIG. 8, the check valve assembly 60 includes a second through hole 61, a valve component 62 and an elastic component 63.

The second through hole 61 is defined in the second sidewall 12, and is, for example, a rectangular opening. The valve component 62 is configured to abut against an edge of the second through hole to close the second through hole in response to the check valve assembly 60 being in the closed state; and configured to be separated from at least a portion of the edge of the second through hole in response to the check valve assembly 60 being in the open state, such that the airflow may enter the accommodation space 30 via the second through hole 61.

The elastic component 63 is connected to the valve component 62, and is configured to bias the valve component 62 to a position where the second through hole 61 is sealed.

Specifically, the valve component 62 includes a plate-like structure 621 and a pivoting portion 622 connected to the plate-like structure 621. The plate-like structure 622, for example, is rectangular and has a size slightly larger than the size of the second through hole 61. When the check valve assembly 60 is in the closed state, the plate-like structure 622 is closely adhered to the edge of the second through hole 61 from the inside of the dust box 150 to the outside, so that the second through hole 6 may be sealed. When the check valve assembly 60 is changed from the closed state to the open state, the plate-like structure 621 may move toward the inside of the dust box 150, such that the plate-like structure 621 is separated from at least a portion of the edge of the second through hole 61, and then the airflow may enter the accommodation space 30 via the second through hole 61. The pivoting portion 622 is a "T"-like structure, which is pivotally connected to the outer surface of the second sidewall 12, and the pivoting portion 622 is rotatable around a pivot axis AX with respect to the second sidewall 12. The pivot axis AX, for example, extends substantially perpendicular to the direction of the bottom wall 15, such that the pivoting portion 622 is rotatable in a plane that is substantially parallel to the bottom wall 15. The end of the pivoting part 622 away from the pivot axis AX is fixedly connected to the plate-like structure 621, such that the valve component 62 is rotatable around the pivot axis AX as a whole.

The elastic component 63, for example, a spring, is matched and connected with the pivoting portion 622, and under the elastic action of the elastic component, the valve component 62 is biased at the position where the second through hole 61 is sealed.

In some embodiments, as shown in FIGS. 5-7, the dust box 150 further includes a filter screen assembly 50, which is configured to be detachably placed in the accommodation space 30. The filter screen assembly 50 is, for example, a plate in a roughly rectangular shape. The inner wall of the sidewall of the dust box body 10 is provided with a stepped structure configured to support the filter screen assembly 50. The filter screen assembly 50 divides the accommodation space 30 into a first accommodation space 31 and a second accommodation space 32. The first accommodation space 31 and the second accommodation space 32 are located at two sides of the filter screen assembly 50, respectively. Specifically, the first accommodation space 31 is located at one side of the filter screen assembly 50 close to the bottom wall 15; the second accommodation space 32 is located at one side of the filter screen assembly 50 away from the bottom wall 15; the first accommodation space 31 is configured to accommodate the garbage collected in the dust box 150; and the second accommodation space 32 serves as a portion of an air path after the airflow passes through the filter screen assembly 50, so as to ensure the smooth circulation of the airflow.

In some embodiments, the first through hole 41 and the second through hole 61 are both located between the filter screen assembly 50 and the bottom wall 15. Specifically, an orthographic projection of the first accommodation space 31 on the first sidewall 11 covers the first through hole 41, and an orthographic projection of the first accommodation space 31 on the second sidewall 12 covers the second through hole 61. Both the first through hole 41 and the second through hole 61 may allow the first accommodation space 31 to be communicated with the outside world with respect to the dust box 150.

In some embodiments, as shown in FIGS. 5-7, the third sidewall 13 of the dust box 150 is provided with an air outlet 43, and the third sidewall 13 is, for example, another short-side sidewall of the dust box 150, and is disposed opposite to the second sidewall 12. The air outlet 43 is disposed at one side of the filter screen assembly 50 away from the bottom wall 15. An orthographic projection of the second accommodation space 32 on the third sidewall 13 covers the air outlet 43.

In combination with FIGS. 1-7, the first fan 160 of the automatic cleaning apparatus 100 is connected to the air outlet 43 of the dust box 150, to extract the airflow from the accommodation space 30 via the air outlet 43. The ventilation port 1121 of the automatic cleaning apparatus 100 is communicated with the first through hole 41 of the dust box 150 and is a pathway for the garbage to enter or move out of the automatic cleaning apparatus 100.

When the automatic cleaning apparatus is in the cleaning work mode, the first fan 160 works to generate the external acting force applied to the check valve assembly, the external acting force is less than the threshold, and the check valve assembly 60 is in the closed state. Under the action of the suction force generated by the first fan 160, the airflow carrying the garbage enters the first accommodation space 31 from the ventilation port 1121 of the automatic cleaning apparatus 100 via the first through hole 41 of the dust box 150, and is filtered by the filter screen assembly, after which the garbage is left in the first accommodation space 31, and the filtered airflow enters the second accommodation space 32, and is then extracted from the dust box 150 via the air outlet 43 under the action of the suction force generated by the first fan 160.

As shown in FIGS. 1-7, when the automatic cleaning apparatus 100 (for example, a robot vacuum cleaner) returns to the dust-collection charging pile 200 after completing cleaning, the automatic cleaning apparatus 100 moves to the dust-collection charging pile base 210 in a first direction X, such that the charging electrode 140 on the automatic cleaning apparatus 100 is electrically connected to the charging connector 221 to charge the automatic cleaning apparatus 100, and the dust outlet (i.e., the ventilation port 1121) of the automatic cleaning apparatus 100 docks with the dust suction port 211 of the dust-collection charging pile 200. In this case, the garbage in the dust box of the automatic cleaning apparatus 100 can be transferred to the dust-collection container 222 of the dust-collection charging pile 200. At this point, the automatic cleaning apparatus 100 is in the dust exhaust mode, a dust suction port 211 of the dust-collection charging pile 200 may serve as an inlet of the dust collection air path 215; and the dust suction port 211 of the dust-collection charging pile 200 is hermetically communicated with the ventilation port 1121 (i.e., a dust outlet) of the automatic cleaning apparatus 100, located on the dust-collection charging pile base 210. The air inlet of the dust-collection container 222 is hermetically communicated with the outlet of the dust-collection air path 215, and the second fan 223 is connected with the air outlet of the dust-collection container 222. Under the action of the airflow produced by the second fan 223, the garbage in the dust box 150 in the automatic cleaning apparatus 100 may pass through the ventilation port 1121 in the automatic cleaning apparatus 100 and be collected in the dust-collection container 222 via the dust-collection air path 215.

When the automatic cleaning apparatus 100 is located on the dust-collection charging pile base 210 of the dust-collection charging pile 200 to collect the garbage in the dust box 150 into the dust-collection container 222 in the dust-collection charging pile 200, that is, when the automatic cleaning apparatus 100 is in a dust exhaust mode, the second fan 223 in the dust-collection charging pile 200 generates a strong suction force during working, while the first fan 160 in the automatic cleaning apparatus 100 is also in the working state. The first fan 160 and the second fan 223 work simultaneously such that the external acting force applied to the check valve assembly 60 is greater than the threshold, and the check valve assembly 60 is in the open state. At this point, the second through hole 62 serves as the air inlet of the dust box 150; the vast majority of the airflow carries the garbage in the dust box 150 under the action of the strong suction force generated by the second fan 223 with large power, passes through the first through hole 41 of the dust box 150, the ventilation port 1121 of the automatic cleaning apparatus 100, the dust suction port 211 of the dust-collection charging pile 200, and the dust-collection air path 215, and enters the dust-collection container 222, thereby collecting the garbage into the dust-collection container 222. When the automatic cleaning apparatus 100 is in the dust exhaust mode, if the first fan 160 in the automatic cleaning apparatus 100 does not work and only the second fan 223 in the dust-collection charging pile 200 works, the first fan 160 may be reversed under the action of the strong suction force generated by the second fan 223 to cause damage to the first fan 160, although the strong suction force generated by the second fan 223 may still allow the external acting force applied to the check valve assembly 60 to be greater than the threshold and the check valve assembly 60 is in the open state to ensure the smoothness of the entire airflow channel.

In some embodiments, the working power of the first fan 160 in the automatic cleaning apparatus 100 when the automatic cleaning apparatus 100 is in the dust exhaust mode is less than or equal to the working power of the first fan 160 when the automatic cleaning apparatus 100 is in the cleaning work mode. The working power of the first fan 160 in the automatic cleaning apparatus 100 when the automatic cleaning apparatus 100 is in the dust exhaust mode is as smaller as possible as long as it is ensured that the first fan 160 is not damaged. In such a way, the power consumption in the whole process of collecting the garbage in the dust box into the dust-collection container can be reduced.

Finally, it should be noted that the embodiments in the Description are described in a progressive manner, each embodiment focuses on the differences from other embodiments, and the same or similar parts among these embodiments may refer to one another. For the system or device disclosed in the embodiments, it is described in a relatively simple manner since the system or device corresponds to the method disclosed in the embodiments, and a reference can be made to the description in the method section for the relevant content.

The above embodiments are only intended to illustrate the technical solutions of the present disclosure and are not intended to limit the present disclosure. Although the present disclosure has been described in detail with reference to the foregoing embodiments, those of ordinary skill in the art should understand that: they can still make modifications to the technical solutions described in the foregoing embodiments, or make equivalent substitutions to some of the technical features; and these modifications or substitutions do not deviate the nature of the corresponding technical solutions from the spirit and scope of the technical solutions of the various embodiments of the present disclosure.

What is claimed is:

1. A dust box, comprising:

a dust box body, comprising a bottom wall and sidewalls disposed around edges of the bottom wall, wherein the sidewalls extend from the bottom wall away from the bottom wall, the bottom wall and the sidewalls define an accommodation space; and wherein the sidewalls comprise a first sidewall and a second sidewall, the first sidewall is defined with a first through hole, and the first through hole is a pathway for garbage to enter or move out of the accommodation space, a check valve assembly is disposed on the second sidewall of the dust box, wherein the check valve assembly includes a second through hole defined on the second sidewall, and the check valve assembly is biased in a closed state, and in response to an external acting force applied to the check valve assembly being greater than a threshold, the check valve assembly is switched from the closed state to an open state, and when the check valve assembly is in the open state, the second through hole serves as an air inlet of the dust box, such that the garbage in the dust box is collected via the first through hole under an action of a fan.

2. The dust box according to claim 1, wherein the check valve assembly further comprises:

a valve component, wherein the valve component is configured to abut against an edge of the second through hole to close the second through hole in response to the check valve assembly being in the closed state; and the valve component is configured to be separated from at least a portion of the edge of the second through hole in response to the check valve assembly being in the open state, such that an airflow enters the accommodation space via the second through hole; and an elastic component connected to the valve component, and configured to bias the valve component to a position where the second through hole is closed.

3. The dust box according to claim 2, wherein the second sidewall is adjacent to the first sidewall.

4. The dust box according to claim 3, further comprising:

a filter screen assembly detachably accommodated in the accommodation space, wherein the filter screen assembly divides the accommodation space into a first accommodation space and a second accommodation space, and the first accommodation space and the second accommodation space are disposed sequentially away from the bottom wall; and the first through hole and the second through hole are both located between the filter screen assembly and the bottom wall.

5. The dust box according to claim 4, wherein the sidewalls further comprise a third sidewall defined with an air outlet; the air outlet is disposed at a side of the filter screen assembly away from the bottom wall; and the second sidewall is opposite to the third sidewall.

6. An automatic cleaning apparatus, comprising:

the dust box according to claim 5;

a first fan connected to the air outlet, wherein the first fan is configured to extract an airflow from the accommodation space via the air outlet; and a ventilation port communicated with the first through hole to provide a pathway for the garbage to enter or move out of the automatic cleaning apparatus.

7. The automatic cleaning apparatus according to claim 6, wherein in response to the automatic cleaning apparatus being in a cleaning work mode, the first fan generates the external acting force applied to the check valve assembly, and the external acting force is less than the threshold.

8. A dust collection pile, wherein the dust collection pile is configured to collect the garbage in the dust box of the automatic cleaning apparatus according to claim 6, and the dust collection pile comprises:

a dust-collection air path provided with an inlet and an outlet, wherein the inlet of the dust-collection air path is configured to be communicated with the ventilation port when the automatic cleaning apparatus is connected to the dust collection pile to carry out a dust collection operation;

a dust-collection container provided with an air inlet and an air outlet, wherein the air inlet of the dust-collection container is communicated with the outlet of the dust-collection air path, and the dust-collection container is configured to accommodate the garbage from the dust box of the automatic cleaning apparatus; and a second fan connected to the air outlet of the dust-collection container to extract the airflow from the accommodation space via the first through hole.

9. The dust collection pile according to claim 8, wherein in response to the automatic cleaning apparatus being in a dust exhaust mode, the first fan and the second fan simultaneously generate the external acting force applied to the check valve assembly, and the external acting force is greater than the threshold.

10. The dust collection pile according to claim 9, wherein a working power of the first fan when the automatic cleaning apparatus is in the dust exhaust mode is less than or equal to a working power of the first fan when the automatic cleaning apparatus is in a cleaning work mode.

11. The automatic cleaning apparatus according to claim 6, further comprising a cleaning module configured to clean at least a portion of a support surface when the automatic cleaning apparatus moves on the support surface, wherein the dust box is communicated with the cleaning module.

12. The automatic cleaning apparatus according to claim 11, wherein the support surface is ground.

13. The automatic cleaning apparatus according to claim 6, wherein the dust box comprises a dust box cover, wherein the dust box cover matches the dust box body and is configured to cover a top of the accommodation space.

14. The dust box according to claim 5, wherein an orthographic projection of the second accommodation space on the third sidewall covers the air outlet.

15. The dust box according to claim 4, wherein the filter screen assembly is a rectangular shaped plate, an inner wall of the sidewall of the dust box body is provided with a stepped structure, and the stepped structure is configured to support the filter screen assembly.

16. The dust box according to claim 4, wherein an orthographic projection of the first accommodation space on the first sidewall covers the first through hole, and an orthographic projection of the first accommodation space on the second sidewall covers the second through hole.

17. The dust box according to claim 2, wherein the valve component comprises a plate-like structure and a pivoting portion connected to the plate-like structure.

18. The dust box according to claim 17, wherein the elastic component is a spring, and the elastic component is connected with the pivoting portion, and configured to bias the valve component to a position where the second through hole is closed.

19. The dust box according to claim 1, further comprising: a dust box cover, wherein the dust box cover matches the dust box body and is configured to cover a top of the accommodation space.

20. The dust box according to claim 19, wherein the dust box cover is pivotally connected to the sidewall of the dust box body.

* * * * *